US008268256B2

(12) United States Patent
Yoshimi et al.

(10) Patent No.: US 8,268,256 B2
(45) Date of Patent: Sep. 18, 2012

(54) HOLDING SEALING MATERIAL, METHOD FOR MANUFACTURING HOLDING SEALING MATERIAL, AND EXHAUST GAS PURIFYING APPARATUS

(75) Inventors: Mitsunori Yoshimi, Takahama (JP); Masayuki Eguchi, Takahama (JP); Yasuhiro Tsuchimoto, Ogaki (JP)

(73) Assignee: Ibiden Co., Ltd., Ogaki-Shi (JP)

( * ) Notice: Subject to any disclaimer, the term of this patent is extended or adjusted under 35 U.S.C. 154(b) by 561 days.

(21) Appl. No.: 12/424,813

(22) Filed: Apr. 16, 2009

(65) Prior Publication Data

US 2009/0269255 A1    Oct. 29, 2009

(30) Foreign Application Priority Data

Apr. 23, 2008    (JP) ................................. 2008-112825

(51) Int. Cl.
*B01D 50/00*    (2006.01)
(52) U.S. Cl. ...................................................... 422/179
(58) Field of Classification Search .................. 422/177, 422/179, 180
See application file for complete search history.

(56) References Cited

U.S. PATENT DOCUMENTS

| 2,970,556 | A | * | 2/1961 | Johnson .......................... 112/315 |
| 3,874,958 | A | * | 4/1975 | Scholtis et al. .................... 216/7 |
| 4,228,208 | A | * | 10/1980 | Smith et al. ...................... 428/95 |
| 4,722,203 | A | * | 2/1988 | Darjee ............................. 66/202 |
| 5,032,441 | A |   | 7/1991 | Ten Eyck et al. |
| 5,332,609 | A | * | 7/1994 | Corn .................................. 428/77 |
| 6,737,146 | B2 | * | 5/2004 | Schierz et al. .................... 428/74 |
| 2004/0052698 | A1 | * | 3/2004 | Sanocki et al. ............... 422/179 |

FOREIGN PATENT DOCUMENTS

| EP | 0328293 |   | 8/1989 |
| EP | 0396330 |   | 11/1990 |
| EP | 1329601 |   | 7/2003 |
| EP | 1908934 |   | 4/2008 |
| JP | 3-3915 |   | 1/1991 |
| JP | 2000-161050 |   | 6/2000 |
| JP | 2001-65337 |   | 3/2001 |
| JP | 2005133340 | A * | 5/2005 |
| JP | 2007-218221 |   | 8/2007 |
| JP | 2007218221 | A * | 8/2007 |
| JP | 2008-30465 |   | 4/2008 |
| JP | 2009-24615 |   | 2/2009 |

OTHER PUBLICATIONS

Japanese Office Action for corresponding JP Application No. 2008-112825, Mar. 13, 2012.

* cited by examiner

*Primary Examiner* — Tom Duong
(74) *Attorney, Agent, or Firm* — Ditthavong Mori & Steiner, P.C.

(57) ABSTRACT

A holding sealing material includes mats which have a longitudinal direction and first and second longer side faces along the longitudinal direction and which include a lower mat and an upper mat laminated on the lower mat. A length of the lower mat in the longitudinal direction is longer than a length of the upper mat in the longitudinal direction. Each of the mats is connected to each other at a fixed portion which extends substantially along a width direction perpendicular to the longitudinal direction. The fixed portion has first and second end portions in the width direction. The first end portion is on a side of the first longer side face. The second end portion is on a side of the second longer side face. The first and second end portions are spaced apart from the first and second longer side face, respectively.

46 Claims, 6 Drawing Sheets

A-A line cross-sectional view

B-B line cross-sectional view

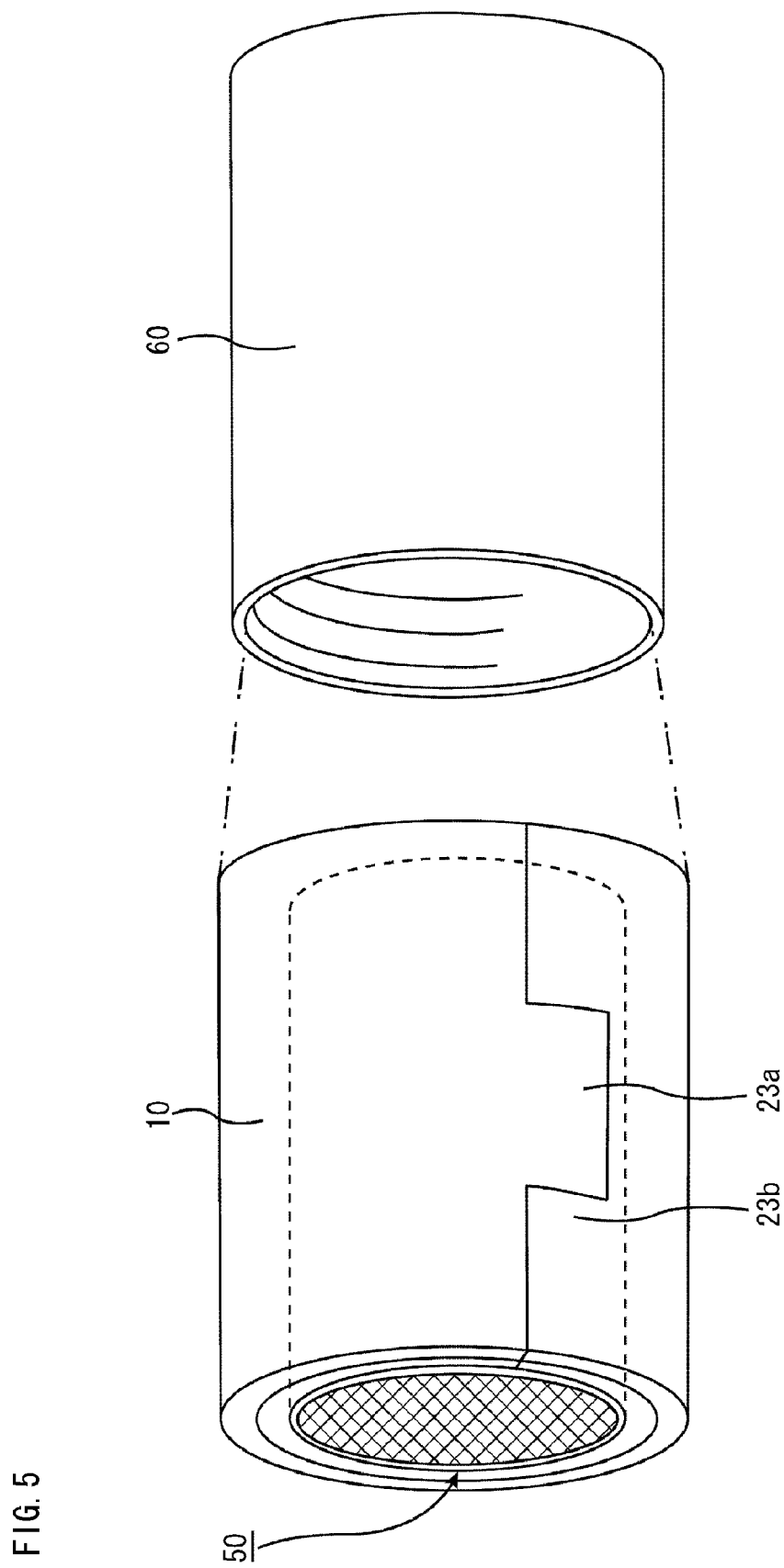

HOLDING SEALING MATERIAL, METHOD FOR MANUFACTURING HOLDING SEALING MATERIAL, AND EXHAUST GAS PURIFYING APPARATUS

CROSS-REFERENCE TO RELATED APPLICATIONS

The present application claims priority under 35 U.S.C. §119 to Japanese patent application JP 2008-112825, filed Apr. 23, 2008, the contents of which are incorporated herein by reference in their entirety.

BACKGROUND OF THE INVENTION

1. Field of the Invention

The present invention relates to a holding sealing material, a method for manufacturing a holding sealing material, and an exhaust gas purifying apparatus.

2. Discussion of the Background

Particulate matters (hereinafter, also referred to as PMs) are contained in exhaust gases discharged from internal combustion engines such as diesel engines, and in recent years, there has arisen a serious problem that these PMs are harmful to the environment and the human bodies. Moreover, since exhaust gases also contain toxic gas components such as CO, HC, and NOx, there have been growing concerns about influences of these toxic gas components on the environment and the human bodies.

In view of these, as an exhaust gas purifying apparatus for collecting PMs in exhaust gases and for purifying the toxic gas components, various exhaust gas purifying apparatuses have been proposed. Each of the exhaust gas purifying apparatuses is configured by: an exhaust gas treating body made of porous ceramics, such as silicon carbide and cordierite; a casing configured to accommodate the exhaust gas treating body; and a holding sealing material made of an inorganic fiber aggregated body that is disposed between the exhaust gas treating body and the casing. This holding sealing material is installed mainly for purposes of preventing the exhaust gas treating body from being damaged upon contact with the casing that covers its periphery because of vibrations and impacts caused by traveling or the like of an automobile and for preventing exhaust gases from leaking between the exhaust gas treating body and the casing.

Here, since the internal combustion engines are operated at an air fuel ratio close to the theoretical air fuel ratio for the purpose of improvement in fuel consumption, exhaust gases tend to increase their temperature and pressure. When exhaust gases having a high temperature and a high pressure reach the exhaust gas purifying apparatus, the difference of coefficient of thermal expansion between the exhaust gas treating body and the casing leads to variations of the interval therebetween. Therefore, the holding force of the exhaust gas treating body that does not change with some variations of the intervals is required of the holding sealing material. In order to allow the exhaust gas treating body to effectively exert exhaust gas treating properties, there has been a growing demand for a holding sealing material having heat insulating property to keep the exhaust gas treating body warm.

For the purpose of fulfilling these demands, there has been employed, in recent years, a designing method to increase the thickness of the holding sealing material and thereby improve heat insulating property. In such a holding sealing material, it is necessary to increase the unit weight of the holding sealing material for securing the repulsive force of inorganic fibers which is a factor of the holding force.

However, it becomes difficult to obtain sufficient peel strength in the needling treatment to be performed in the manufacturing process in order to raise the peel strength in a thickness direction, as the thickness of an inorganic fiber aggregate is increased. Accordingly, when an exhaust gas treating body around which the holding sealing material has been wound is press-fitted into a casing, marked shear deformation of the holding sealing material and the like may be caused.

On the other hand, a holding sealing material has been proposed which exhibits a higher weight by combining a plurality of mats having the same weight as the weight of conventional mats instead of changing the thickness of each of the holding sealing materials. There is disclosed a holding sealing material, which is configured by laminating a plurality of heat-resistant mats, which makes it possible to wind each of the mats without any looseness when each of the mats is wound around an exhaust gas treating body while laminated, and which has a length set so as to allow the engaging portions formed on both end portions to engage each other (JP-A 2007-218221).

Here, in the holding sealing material of JP-A 2007-218221, when a plurality of mats are laminated, a fixed portion is provided by machine-sewing in order to prevent the problematic displacement in a width direction of each of the mats.

The contents of JP-A 2007-218221 are incorporated herein by reference in their entirety.

SUMMARY OF THE INVENTION

According to one aspect of the present invention, a holding sealing material includes a plurality of mats. The plurality of mats have a longitudinal direction and first and second longer side faces along the longitudinal direction and include a lower mat and an upper mat laminated on the lower mat. Each of the plurality of mats includes inorganic fibers and has a substantially rectangular shape. A length of the lower mat in the longitudinal direction is longer than a length of the upper mat in the longitudinal direction. Each of the plurality of mats is connected to each other at a fixed portion which extends substantially along a width direction perpendicular to the longitudinal direction of the plurality of mats. The fixed portion has a first end portion and a second end portion in the width direction. The first end portion is on a side of the first longer side face. The second end portion is on a side of the second longer side face. The first end portion and the second end portion are spaced apart from the first longer side face and the second longer side face, respectively.

According to another aspect of the present invention, a method for manufacturing a holding sealing material includes laminating a plurality of mats. The plurality of mats have a longitudinal direction and first and second longer side faces along the longitudinal direction and include a lower mat and an upper mat to be laminated on the lower mat. Each of the plurality of mats includes inorganic fibers and has a substantially rectangular shape. A length of the lower mat in the longitudinal direction is longer than a length of the upper mat in the longitudinal direction. Each of the plurality of mats is connected to each other at a fixed portion which extends substantially along a width direction perpendicular to the longitudinal direction of the plurality of mats. The fixed portion has a first end portion and a second end portion in the width direction. The first end portion is on a side of the first longer side face. The second end portion is on a side of the second longer side face. The first end portion and the second end portion are spaced apart from the first longer side face and the second longer side face, respectively.

According to further aspect of the present invention, an exhaust gas purifying apparatus includes an exhaust gas treating body, a casing, and a holding sealing material. The exhaust gas treating body includes cell walls longitudinally extending to define cells. The casing accommodates the exhaust gas treating body. The holding sealing material is provided between the exhaust gas treating body and the casing to hold the exhaust gas treating body. The holding sealing material includes a plurality of mats. The plurality of mats have a longitudinal direction and first and second longer side faces along the longitudinal direction and include a lower mat and an upper mat laminated on the lower mat. Each of the plurality of mats includes inorganic fibers and has a substantially rectangular shape. A length of the lower mat in the longitudinal direction is longer than a length of the upper mat in the longitudinal direction. Each of the plurality of mats is connected to each other at a fixed portion which extends substantially along a width direction perpendicular to the longitudinal direction of the plurality of mats. The fixed portion has a first end portion and a second end portion in the width direction. The first end portion is on a side of the first longer side face. The second end portion is on a side of the second longer side face. The first end portion and the second end portion are spaced apart from the first longer side face and the second longer side face, respectively.

According to the other aspect of the present invention, an exhaust gas purifying apparatus includes an exhaust gas treating body, a casing, and a holding sealing material. The exhaust gas treating body includes cell walls longitudinally extending to define cells. The casing accommodates the exhaust gas treating body. The holding sealing material is provided between the exhaust gas treating body and the casing to hold the exhaust gas treating body. The holding sealing material is manufactured using a method which includes laminating a plurality of mats. The plurality of mats have a longitudinal direction and first and second longer side faces along the longitudinal direction and include a lower mat and an upper mat to be laminated on the lower mat. Each of the plurality of mats includes inorganic fibers and has a substantially rectangular shape. A length of the lower mat in the longitudinal direction is longer than a length of the upper mat in the longitudinal direction. Each of the plurality of mats is connected to each other at a fixed portion which extends substantially along a width direction perpendicular to the longitudinal direction of the plurality of mats. The fixed portion has a first end portion and a second end portion in the width direction. The first end portion is on a side of the first longer side face. The second end portion is on a side of the second longer side face. The first end portion and the second end portion are spaced apart from the first longer side face and the second longer side face, respectively.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 5 is a perspective view schematically illustrating the procedure of manufacturing an exhaust gas purifying apparatus according to one embodiment of the present invention.

DESCRIPTION OF THE EMBODIMENTS

Figure 1:
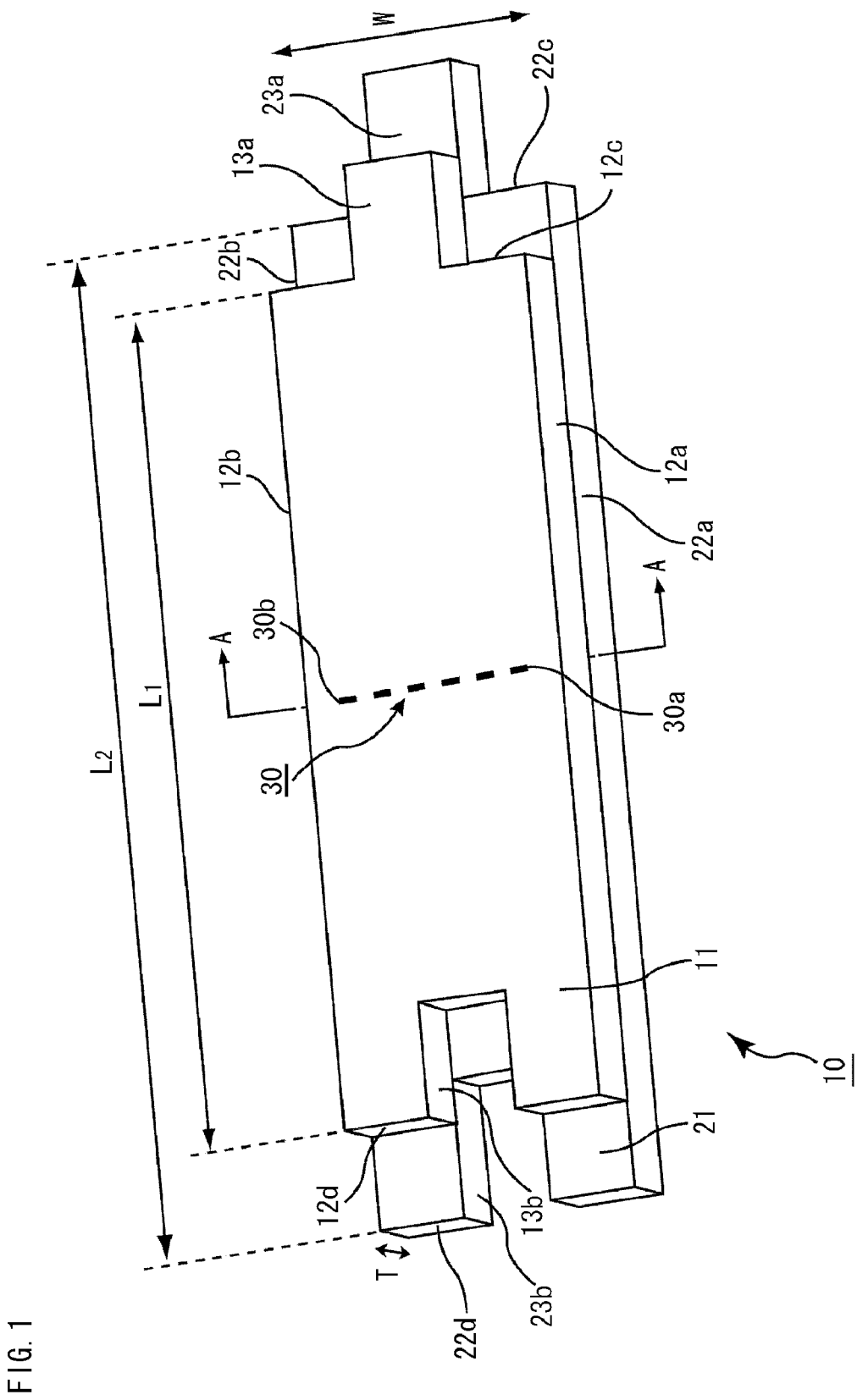
FIG. 1 is a perspective view illustrating a holding sealing material according to one embodiment of the present invention.

Embodiments will now be described with reference to the accompanying drawings, wherein like reference numerals designate corresponding or identical elements throughout the various drawings.

A holding sealing material according to embodiments of the present invention includes: a plurality of mats including inorganic fibers and having a substantially rectangular shape in a plan view, the plurality of mats being laminated, wherein a length of a lower one of the plurality of mats in its longitudinal direction is longer than a length of an upper one of the plurality of mats in its longitudinal direction upon the upper one of the plurality of mats being laminated on the lower one of the plurality of mats, the plurality of mats are fixed to each other by a fixed portion that exists along a width direction substantially perpendicular to the longitudinal direction of the mats, and both end portions of the fixed portion are spaced apart from a longer side face of the mat.

In the holding sealing material according to the embodiments of the present invention, since the plurality of mats are fixed to each other by the fixed portion that exists along the width direction substantially perpendicular to the longitudinal direction of the mats, it may be easier to prevent displacement in the width direction of each of the mats.

Furthermore, since both end portions of the fixed portion are spaced apart from a longer side face of the mat, in the case where the fixed portion is formed by machine-sewing, a sewing thread is less likely to be frayed at the end portion of the fixed portion even when the longer side face is worn and stress is loaded in the vicinity of the longer side face upon handling the holding sealing material. For this reason, it may be easier to prevent the fixed portion from being damaged because of a frayed sewing thread, and consequently to prevent displacement in the width direction of each of the mats.

As thus described, in the holding sealing material according to the embodiments of the present invention, since displacement in the width direction of the mats upon the handling can be prevented, the handling property upon winding the holding sealing material around the exhaust gas treating body tends to be favorable, more likely resulting in improvement in workability.

Here, in the case where the fixed portion is formed by one line of machine-sewing, the number (number of times) of lines of the machine-sewing for forming the fixed portion may be one or a plurality.

Here, in general, if the fixed portion is formed by one line of machine-sewing, breakage of the fixed portion because of a frayed sewing thread is more likely to occur in comparison with the case where the fixed portion is formed by a plurality of lines of machine-sewing. It is because if some lines of machine-sewing with no frayed sewing thread remain out of a plurality of lines of machine sewing, it does not lead to breakage of the fixed portion; in contrast, if the fixed portion is formed by one line, a frayed sewing thread upon handling directly leads to breakage of the fixed portion. In addition, in the case of a plurality of lines of machine-sewing, the stress to be loaded per one line of machine-sewing is dispersed and decreased; whereas, in one line of machine-sewing, the stress to be loaded upon handling is not dispersed and is increased, unlike the case of a plurality of lines of machine-sewing.

However, in the holding sealing material according to the embodiments of the present invention, since both end portions of the fixed portion are spaced apart from a longer side face of the mat, a sewing thread is less likely to be frayed. Therefore, in the holding sealing material according to the embodiments of the present invention, especially when the fixed portion is formed by one machine-sewing, the effects of the holding sealing material according to the embodiments of the present invention can be suitably exerted.

Since the longer side face of the mat is not machine-sewn, some of the inorganic fibers that form the longer side face do not break, and the strength of the inorganic fibers is not lowered. Therefore, even when the holding sealing material according to the embodiments of the present invention is wound around the exhaust gas treating body and press-fitted into a casing, a crack tends not to occur around the longer side face, and it may be easier to prevent breakage of the holding sealing material.

In addition, since some of the inorganic fibers that form the longer side face do not break, the longer side face also has the same resistance to wind erosion as other portions has. Therefore, it may be easier to prevent the wind erosion of the longer side face as the exhaust gases flow.

As thus described, since the longer side face of the holding sealing material according to the embodiments of the present invention is not machine-sewn, and since some of the inorganic fibers that form the longer side face do not break, it may be easier to prevent breakage of the holding sealing material and wind erosion. Therefore, in the exhaust gas purifying apparatus using the holding sealing material according to the embodiments of the present invention, it may be easier to maintain high holding force of the exhaust gas treating body, and to prevent leakage of the exhaust gases.

In the holding sealing material according to the embodiments of the present invention, the shortest distance between a first end portion of the fixed portion and a first longer side face of the mat is a first shortest distance, the shortest distance between a second end portion of the fixed portion and a second longer side face of the mat is a second shortest distance, and a total of the first shortest distance and the second shortest distance is desirably from about 0.5% to about 50% of a length of the mat in its width direction. Therefore, since the interval between the end portion of the fixed portion and the longer side face of the mat is sufficiently secured at both end portions of the fixed portion, it is especially suitable for exerting the effects of the holding sealing material according to the embodiments of the present invention.

In the case where the total of the first shortest distance and the second shortest distance is about 0.5% or more of the length of the mat in its width direction, the interval between the end portion of the fixed portion and the longer side face of the mat tends to be sufficiently secured.

In contrast, when the total of the first shortest distance and the second shortest distance is about 50% or less of the length of the mat in its width direction, the portion where the fixed portion is formed is not too small, and the mat tends not to be turned over from the side of the longer side face of the mat.

Here, in the present description, the shortest distance refers to the shortest interval among the intervals between the end portion of the fixed portion and the longer side face of the mat.

In the holding sealing material according to the embodiments of the present invention, the fixed portion desirably has at least one of a folding point and an inflection point. In this case, the mats tend to be more firmly fixed to each other.

In the holding sealing material according to the embodiments of the present invention, the mat desirably has a thickness of about 1.5 mm to about 15 mm. In this case, it may be easier to maintain sufficient holding force and simultaneously prevent wrinkles in the portion of the inner peripheral side and the tensile stress in the portion of the outer peripheral side when the thickness of the mat is extremely increased.

In the holding sealing material according to the embodiments of the present invention, needling treatment is desirably carried out on the mat in the width direction substantially perpendicular to the longitudinal direction. In this case, since the portion on which needling treatment is carried out is formed with a crease in its width direction of the mats, it is easier to wind the holding sealing material around the exhaust gas treating body.

In the holding sealing material according to the embodiments of the present invention, the fixed portion is desirably formed by machine-sewing using a sewing thread. In this case, the fixed portion tends to be formed easily and the mats tend to be firmly fixed to each other.

In the holding sealing material according to claim the embodiments of the present invention, the machine-sewing is desirably carried out by lock stitching. In this case, the stitches cannot be frayed easily even with some vibration upon handling, and the mats tend to be firmly fixed to each other.

In the holding sealing material according to the embodiments of the present invention, reverse stitching is desirably carried out on at least one of a starting point and an end point of the machine-sewing. In this case, the stitches cannot be frayed easily, and the mats tend to be kept firmly fixed to each other for a long period of time.

In the holding sealing material according to the embodiments of the present invention, a stitch length of the machine-sewing is desirably from about 1 mm to about 100 mm.

In the holding sealing material according to the embodiments of the present invention, the sewing thread desirably includes one of cotton and polyester. In this case, after winding the holding sealing material around the exhaust gas treating body and assembling it to the exhaust gas purifying apparatus, the sewing thread is more likely to be burned down with the hot exhaust gases that have been discharged by the first operation of the internal combustion engine. Here, when the fixed portion remains even after assembling it to the exhaust gas purifying apparatus, local stress may occur in the portion, and the holding sealing material may be damaged. When the sewing thread is burned down, there is no possibility of the damage, with the result that it may be easier to exert the function of the holding sealing material in a stable manner for a long period of time.

In the holding sealing material according to the embodiments of the present invention, the sewing thread desirably has a diameter of about 0.1 mm to about 5 mm. In this case, the sewing thread is less likely to be cut, and it may be easier to form the fixed portion while minimizing the damage to the inorganic fibers that form the vicinity of the stitches upon sewing.

In the holding sealing material according to the embodiments of the present invention, the sewing thread desirably has a color other than a transparent color and different from a color of the mat. In this case, the work efficiency tends to be improved by raising the visibility for checking whether the fixed portion has been formed.

A method for manufacturing a holding sealing material according to the embodiments of the present invention includes: laminating a plurality of mats so that a length of a lower one of the plurality of mats in its longitudinal direction is longer than a length of an upper one of the plurality of mats in its longitudinal direction upon the upper one of the plurality of mats being laminated on the lower one of the plurality of mats; and fixing the plurality of laminated mats to each other by a fixed portion, wherein the fixed portion is formed so as to extend in a width direction substantially perpendicular to the longitudinal direction of the mats and so that both end portions of the fixed portion are spaced apart from a longer side face of the mat, and thereby the mats are fixed to each other.

In the method for manufacturing a holding sealing material according to the embodiments of the present invention, it may be easier to suitably manufacture the holding sealing material according to the embodiments of the present invention by performing the above-mentioned processes.

In the method for manufacturing a holding sealing material according to the embodiments of the present invention, the fixed portion is formed so that: the shortest distance between a first end portion of the fixed portion and a first longer side face of the mat is a first shortest distance; the shortest distance between a second end portion of the fixed portion and a second longer side face of the mat is a second shortest distance; and a total of the first shortest distance and the second shortest distance is desirably from about 0.5% to about 50% of a length of the mat in its width direction.

In the method for manufacturing a holding sealing material according to the embodiments of the present invention, it may be easier to suitably manufacture the holding sealing material according to the embodiments of the present invention by performing the above-mentioned processes.

In the method for manufacturing a holding sealing material according to the embodiments of the present invention, the fixed portion is desirably formed so as to have at least one of a folding point and an inflection point.

In the method for manufacturing a holding sealing material according to the embodiments of the present invention, it may be easier to suitably manufacture the holding sealing material according to the embodiments of the present invention by performing the above-mentioned processes.

In the method for manufacturing a holding sealing material according to the embodiments of the present invention, the mat desirably has a thickness of about 1.5 mm to about 15 mm.

In the method for manufacturing a holding sealing material according to the embodiments of the present invention, it may be easier to suitably manufacture the holding sealing material according to the embodiments of the present invention by performing the above-mentioned processes.

In the method for manufacturing a holding sealing material according to the embodiments of the present invention, needling treatment is desirably carried out on the mat in the width direction substantially perpendicular to the longitudinal direction.

In the method for manufacturing a holding sealing material according to the embodiments of the present invention, it may be easier to suitably manufacture the holding sealing material according to the embodiments of the present invention by performing the above-mentioned processes.

In the method for manufacturing a holding sealing material according to the embodiments of the present invention, the fixed portion is desirably formed by machine-sewing using a sewing thread.

In the method for manufacturing a holding sealing material according to the embodiments of the present invention, it may be easier to suitably manufacture the holding sealing material according to the embodiments of the present invention by performing the above-mentioned processes.

In the method for manufacturing a holding sealing material according to the embodiments of the present invention, the machine-sewing is desirably carried out by lock stitching.

In the method for manufacturing a holding sealing material according to the embodiments of the present invention, it may be easier to suitably manufacture the holding sealing material according to the embodiments of the present invention by performing the above-mentioned processes.

In the method for manufacturing a holding sealing material according to the embodiments of the present invention, reverse stitching is desirably carried out on at least one of a starting point and an end point of the machine-sewing.

In the method for manufacturing a holding sealing material according to the embodiments of the present invention, it may be easier to suitably manufacture the holding sealing material according to the embodiments of the present invention by performing the above-mentioned processes.

In the method for manufacturing a holding sealing material according to the embodiments of the present invention, the mats are desirably stitched to each other so that a stitch length of the machine-sewing is from about 1 mm to about 100 mm.

In the method for manufacturing a holding sealing material according to the embodiments of the present invention, it may be easier to suitably manufacture the holding sealing material according to the embodiments of the present invention by performing the above-mentioned processes.

In the method for manufacturing a holding sealing material according to the embodiments of the present invention, the sewing thread desirably includes one of cotton and polyester.

In the method for manufacturing a holding sealing material according to the embodiments of the present invention, it may be easier to suitably manufacture the holding sealing material according to the embodiments of the present invention by performing the above-mentioned processes.

In the method for manufacturing a holding sealing material according to the embodiments of the present invention, the sewing thread desirably has a diameter of about 0.1 mm to about 5 mm.

In the method for manufacturing a holding sealing material according to the embodiments of the present invention, it may be easier to suitably manufacture the holding sealing material according to the embodiments of the present invention by performing the above-mentioned processes.

In the method for manufacturing a holding sealing material according to the embodiments of the present invention, the sewing thread desirably has a color other than a transparent color and different from a color of the mat.

In the method for manufacturing a holding sealing material according to the embodiments of the present invention, it may be easier to suitably manufacture the holding sealing material according to the embodiments of the present invention by performing the above-mentioned processes.

An exhaust gas purifying apparatus according to the embodiments of the present invention includes: an exhaust gas treating body in which a large number of cells are longitudinally disposed in parallel with one another with a cell wall interposed therebetween; a casing configured to accommodate the exhaust gas treating body; and a holding sealing material provided between the exhaust gas treating body and the casing and configured to hold the exhaust gas treating body, wherein the holding sealing material includes: a plurality of mats including inorganic fibers and having a rectangular shape in a plan view, the plurality of mats being laminated, wherein a length of a lower one of the plurality of mats in its longitudinal direction is longer than a length of an upper one of the plurality of mats in its longitudinal direction upon the upper one of the plurality of mats being laminated on the lower one of the plurality of mats, the plurality of mats are fixed to each other by a fixed portion that exists along a width direction substantially perpendicular to the longitudinal direction of the mats, and both end portions of the fixed portion are spaced apart from a longer side face of the mat.

In the exhaust gas purifying apparatus according to the embodiments of the present invention, some of the inorganic fibers that form the longer side face do not break. Therefore, the holding force of the exhaust gas treating body tends to be kept high, and leakage of the exhaust gases also tends to be prevented.

An exhaust gas purifying apparatus according to the embodiments of the present invention includes: an exhaust gas treating body in which a large number of cells are longitudinally disposed in parallel with one another with a cell wall interposed therebetween; a casing configured to accommodate the exhaust gas treating body; and a holding sealing material provided between the exhaust gas treating body and the casing and configured to hold the exhaust gas treating body, wherein the holding sealing material includes: laminating a plurality of mats so that a length of a lower one of the plurality of mats in its longitudinal direction is longer than a length of an upper one of the plurality of mats in its longitudinal direction upon the upper one of the plurality of mats being laminated on the lower one of the plurality of mats; and fixing the plurality of laminated mats to each other by a fixed portion, wherein the fixed portion is formed so as to extend in a width direction substantially perpendicular to the longitudinal direction of the mats and so that both end portions of the fixed portion are spaced apart from a longer side face of the mat, and thereby the mats are fixed to each other.

In the exhaust gas purifying apparatus according to the embodiments of the present invention, some of the inorganic fibers that form the longer side face do not break. Therefore, the holding force of the exhaust gas treating body tends to be kept high, and leakage of the exhaust gases also tends to be prevented.

(First Embodiment)

The following will discuss a first embodiment, one embodiment of a holding sealing material of the present invention and a method for manufacturing a holding sealing material, with reference to the drawings.

FIG. 1 is a perspective view illustrating the holding sealing material of the present embodiment. As illustrated in FIG. 1, in a holding sealing material 10 of the present embodiment, two mats 11 and 21 having a rectangular shape in a plan view and having a predetermined length (hereinafter, simply referred to as a full length, and indicated by arrows $L_1$ and $L_2$ in FIG. 1) in a longitudinal direction, a width (indicated by an arrow W in FIG. 1), and a thickness (indicated by an arrow T in FIG. 1) are laminated.

In the following description, a side face 12a parallel to the longitudinal direction of the mat 11 and a side face 22a parallel to the longitudinal direction of the mat 21 are referred to as first longer side faces. Also, a side face 12b parallel to the longitudinal direction of the mat 11 and the side face 22b parallel to the longitudinal direction of the mat 21 are referred to as second longer side faces.

In addition, the side faces 12c and 12d substantially perpendicular to the longitudinal direction of the mat 11 and the side faces 22c and 22d substantially perpendicular to the longitudinal direction of the mat 21 are referred to as shorter side faces.

In the holding sealing material 10, the full length $L_2$ of the mat 21 is longer than the full length $L_1$ of the mat 11.

Furthermore, the thickness of each of the mats 11 and 21 is from about 1.5 mm to about 15 mm.

Here, the two mats 11 and 21 are laminated in the holding sealing material 10 illustrated in FIG. 1, and the number of the mats to be laminated is not particularly limited and may be three or more.

In addition, both of the mats 11 and 21 include inorganic fibers.

The inorganic fibers that form the mats 11 and 21 are not particularly limited, and may be alumina-silica fibers, or may be alumina fibers, silica fibers, or the like. It is necessary to change heat resistance, resistance to wind erosion, and the like based on the characteristics and the like required of the sealing material. In the case of using alumina-silica fibers as inorganic fibers, for example, the fibers can be used in which the composition ratio of alumina to silica is from about (60:40) to about (80:20).

The case of winding the holding sealing material 10 around the exhaust gas treating body will be described later in detail. The holding sealing material 10 is wound around the exhaust gas treating body in such a manner that the shorter side faces 12c and 12d of the mat 11 are contacted with each other, and the shorter side faces 22c and 22d of the mat 21 are contacted with each other, with the longitudinal direction of the holding sealing material 10 being the winding direction.

Here, the projected portions 13a and 23a are formed at the shorter side faces 12c and 22c of the mats 11 and 21, respectively, and the recessed portions 13b and 23b are formed at the shorter side faces 12d and 22d on the other side, respectively. Therefore, when the holding sealing material 10 is wound, the projected portion 13a and the recessed portion 13b of the mat 11 are exactly fitted to each other, and so are the projected portion 23a and the recessed portion 23b of the mat 21.

The mats 11 and 21 are prepared as needle mats obtained by carrying out needling treatment on a base mat including inorganic fibers. The needling treatment refers to a process in which a fiber entangling means such as a needle is inserted into and removed from the base mat. In the mats 11 and 21, inorganic fibers having a comparatively long average fiber length are entangled with one another three-dimensionally by the needling treatment. Moreover, the inorganic fibers have a certain average fiber length to form the entangled structure, and, for example, the average fiber length of the inorganic fibers is from about 50 μm to about 100 mm.

The holding sealing material of the present embodiment may contain a binder such as an organic binder, so as to suppress the volume of the holding sealing material and to enhance the workability prior to the assembling processes of the exhaust gas purifying apparatus.

In the holding sealing material of the present embodiment, the mat 11 and the mat 21 are fixed to each other in the fixed portion 30 that exists along the width direction substantially perpendicular to the longitudinal direction of the mats 11 and 21.

The fixed portion 30 will be described in detail with reference to FIG. 2.

Figure 2:
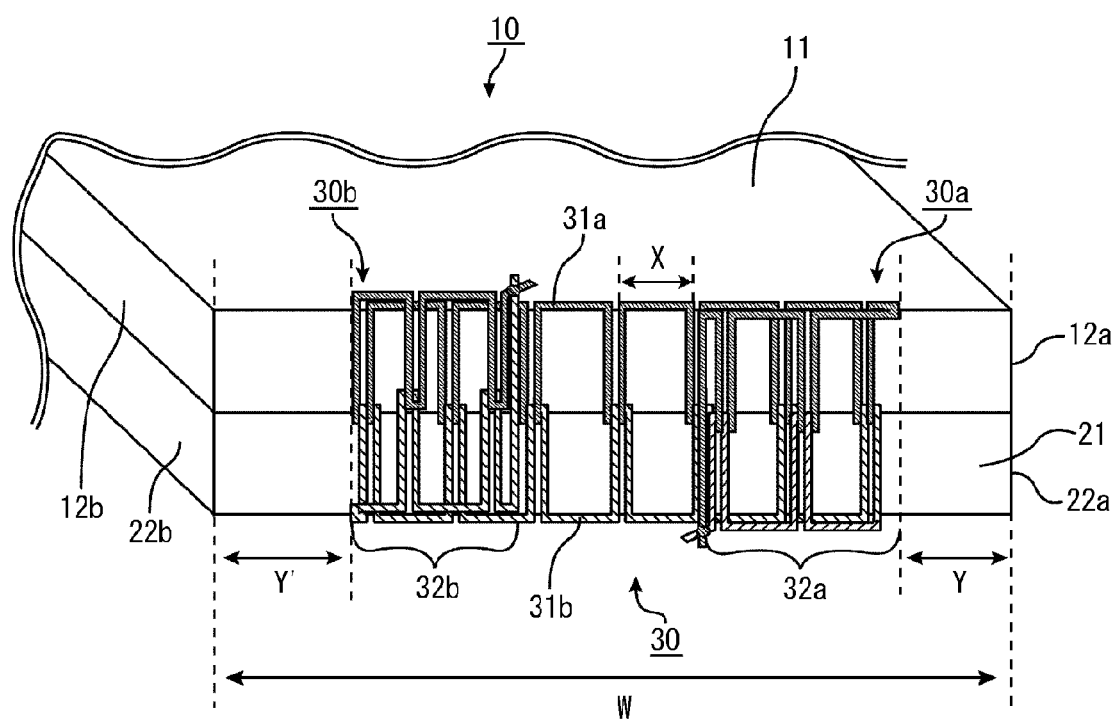
FIG. 2 is an A-A line cross-sectional view of a holding sealing material according to one embodiment of the present invention illustrated in FIG. 1.

FIG. 2 is an A-A line cross-sectional view of a holding sealing material of the present embodiment illustrated in FIG. 1.

As illustrated in FIG. 2, the fixed portion 30 is formed by lock stitching (machine-sewing) with sewing threads 31a (an upper thread) and 31b (a bobbin thread).

Each of the sewing threads 31a and 31b has a diameter of about 0.1 mm to about 5 mm and includes cotton or polyester. Moreover, its color is other than a transparent color and differs from the color of the mats 11 and 21. When the mats 11 and 21 are white, for example, the color of the sewing threads 31a and 31b may be red, blue, yellow, green, black, or the like.

Reverse stitching is carried out on the areas 32a and 32b including a starting point and an end point of the machine-sewing.

The stitch length (indicated by a double-pointed arrow X in FIG. 2) is from about 1 mm to about 100 mm.

The first end portion 30a of the fixed portion 30 is spaced apart from the first longer side faces 12a and 22a of the mats 11 and 21, and the second end 30b is spaced apart from the second longer side faces 12b and 22b of the mats 11 and 21.

Moreover, the total of the shortest distance (indicated by a double-pointed arrow Y in FIG. 2) between the first end portion 30a of the fixed portion 30 and the first longer side faces 12a and 22a of the mats 11 and 21, and the shortest distance (length indicated by a double-pointed arrow Y' in FIG. 2) between the second end portion 30b of the fixed portion 30 and the second longer side faces 12b and 22b of the mats 11 and 21 is from about 0.5% to about 50% of the length of the mat in the width direction (indicated by an arrow W in FIG. 2) of the mats 11 and 21.

Next, the configuration of the exhaust gas purifying apparatus of the present embodiment using the holding sealing material of the present embodiment will be described with reference to FIG. 3A and FIG. 3B.

Figure 3A:
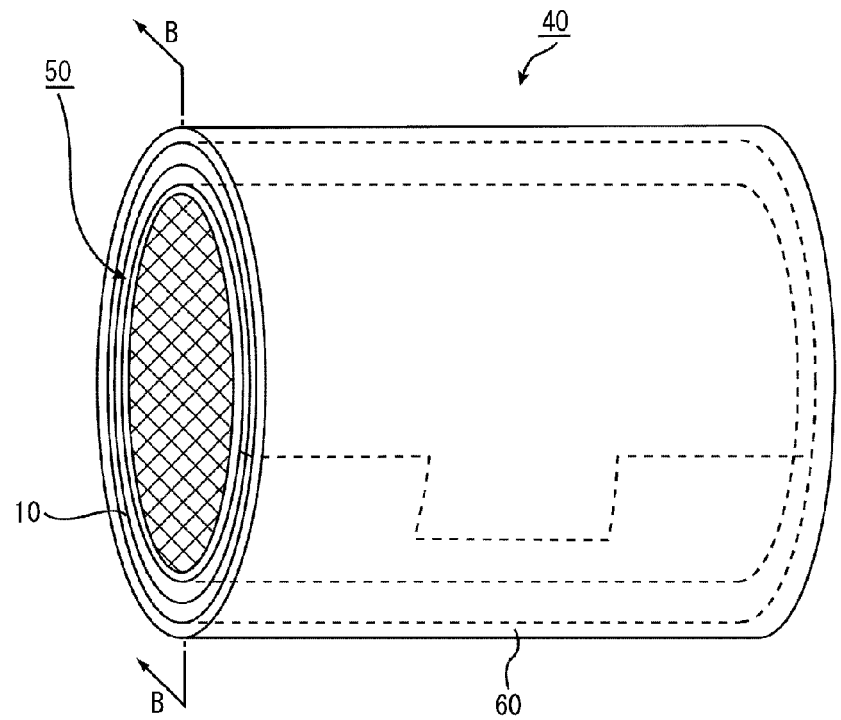
FIG. 3A is a perspective view schematically illustrating an exhaust gas purifying apparatus according to one embodiment of the present invention.
Figure 3B:
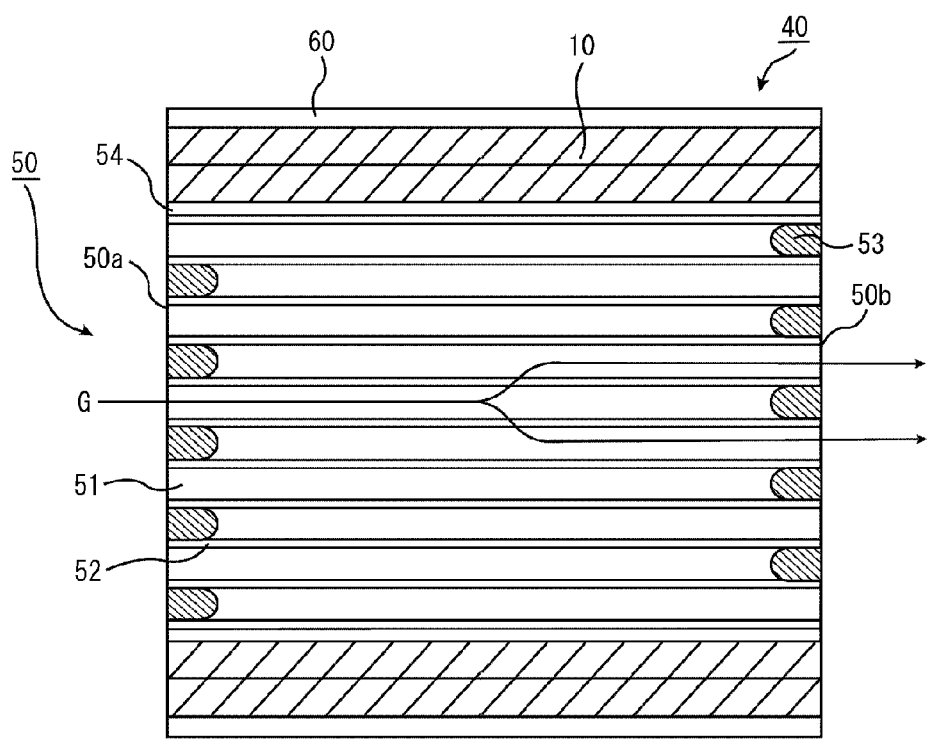
FIG. 3B is a B-B line cross-sectional view of the exhaust gas purifying apparatus illustrated in FIG. 3A.

FIG. 3A is a perspective view schematically illustrating an exhaust gas purifying apparatus of the present embodiment, and FIG. 3B is a B-B line cross-sectional view of the exhaust gas purifying apparatus illustrated in FIG. 3A.

As illustrated in FIG. 3A and FIG. 3B, an exhaust gas purifying apparatus 40 includes: an exhaust gas treating body 50 in which a large number of cells 51 are longitudinally disposed in parallel with one another with a cell wall 52 interposed therebetween; a casing 60 configured to accommodate the exhaust gas treating body 50; and a holding sealing material 10 provided between the exhaust gas treating body 50 and the casing 60 and configured to hold the exhaust gas treating body 50.

If needed, to the end portions of the casing 60 are connected: an introducing pipe configured to introduce exhaust gases discharged by internal combustion engines; and an exhaust pipe with which the exhaust gases that have passed through an exhaust gas purifying apparatus are discharged to the outside.

In the exhaust gas purifying apparatus 40 of the present embodiment, as illustrated in FIG. 3B, as the exhaust gas treating body 50, a honeycomb filter is employed in which either one of the ends of each of the cells is sealed with a plug 53.

The following will discuss the case where exhaust gases pass through the exhaust gas purifying apparatus 40 having the above-mentioned configuration with reference to FIG. 3B.

As illustrated in FIG. 3B, the exhaust gas (in FIG. 3B, the exhaust gas is indicated by G and the flow of the exhaust gas is indicated by arrows) discharged from the internal combustion engines and introduced into the exhaust gas purifying apparatus 40 flows into one cell 51 that opens onto an end face 50a of the exhaust gas inlet side in the honeycomb filter 50, and passes through a cell wall 52 separating the cell 51. At this time, PMs in the exhaust gas are captured in the cell wall 52, and as a result, the exhaust gas is purified. The purified exhaust gas flows out through another cell 51 opening onto the end face 50b of the exhaust gas outlet side, and is discharged to the outside.

Figure 4A:
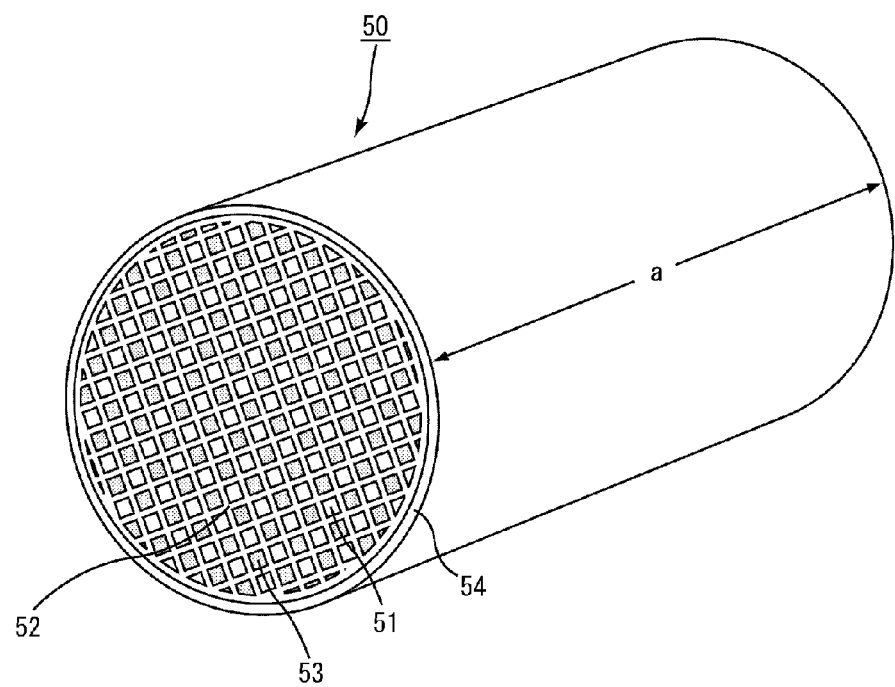
FIG. 4A is a perspective view schematically illustrating a honeycomb filter that configures an exhaust gas purifying apparatus according to one embodiment of the present invention.
Figure 4B:
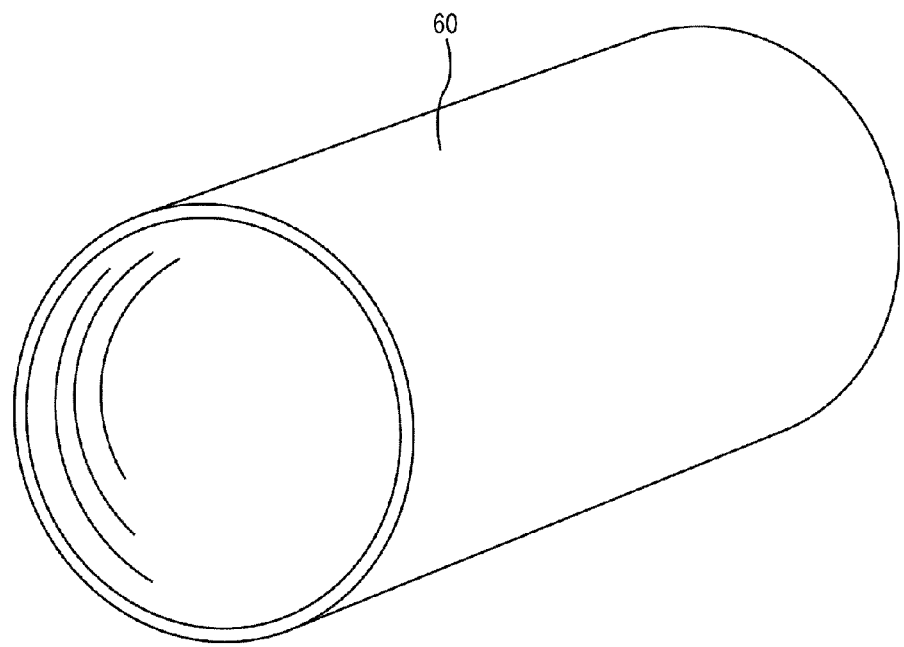
FIG. 4B is a perspective view of a casing that configures the exhaust gas purifying apparatus according to one embodiment of the present invention.

Next, the following will discuss a honeycomb filter and a casing that configure the exhaust gas purifying apparatus 40 with reference to FIG. 4A and FIG. 4B.

Here, the configuration of the holding sealing material 10 will be omitted because it has been already stated.

FIG. 4A is a perspective view schematically illustrating a honeycomb filter that configures an exhaust gas purifying apparatus of the present embodiment, and FIG. 4B is a perspective view of a casing that configures the exhaust gas purifying apparatus of the present embodiment.

As illustrated in FIG. 4A, a honeycomb filter 50 mainly includes porous ceramics and has a round pillar shape. Moreover, a sealing material layer 54 is formed on the periphery of the honeycomb filter 50 for the purposes of reinforcing the peripheral portion of the honeycomb filter 50 and adjusting the shape of the peripheral portion thereof, and improving the heat insulating property of the honeycomb filter 50.

The internal configuration of the honeycomb filter 50 has been already stated in the description of the exhaust gas purifying apparatus of the present embodiment (refer to FIG. 3B).

Subsequently, the casing 60 will be described. The casing 60, illustrated in FIG. 4B, is mainly made of metal such as stainless, and it is formed into a substantially circular cylindrical shape. Moreover, its inner diameter is slightly shorter than the total combined length of the diameter of the end face of the honeycomb filter 50 and the thickness of the holding sealing material 10 wound around the honeycomb filter 50, and its length is virtually the same as the length of the honeycomb filter 50 in the longitudinal direction (direction indicated by an arrow a in FIG. 4A).

Next, the following description will discuss a method for manufacturing a holding sealing material and an exhaust gas purifying apparatus of the present embodiment.

First, a method for manufacturing a holding sealing material will be described.

(1) First, two needle treatment mats having different overall lengths are prepared as mats that form a holding sealing material. Each of the needle treatment mats is manufactured by carrying out the needling treatment on a base mat. The base mat has a structure in which inorganic fibers having a predetermined average fiber length are loosely entangled with one another through a spinning process. By carrying out the needling treatment on the inorganic fibers thus loosely entangled with one another, the inorganic fibers are entangled with one another complicatedly so that a mat having an entangled structure that can maintain its shape to a certain degree without the presence of binder tends to be formed.

Here, the needling treatment can be carried out by using a needling device, for example. The needling device is configured by: a supporting plate for supporting the base mat; and a needle board that is disposed above this supporting plate and capable of moving in a reciprocating manner in a sticking direction (thickness direction of the base mat). A large number of needles are attached to the needle board. This needle board is shifted relative to the base mat mounted on the supporting plate, and the large number of needles are inserted into and removed from the base mat so that the inorganic fibers forming the base mat tends to be entangled complicatedly. The number of the needling treatments and the number of the needles can be altered in accordance with the target bulk density, weight per square meter, and the like.

(2) Next, after cutting a needle treating mat into a predetermined size, a binder liquid is sprayed over the obtained cut mat so that the binder is allowed to adhere to the mat.

By doing so, in the mats to be manufactured through the subsequent processes, the entangled structure among the inorganic fibers tends to be firmer, and the volume of the mats tends to be suppressed.

An emulsion, prepared by dispersing a binder, such as an acrylic-based resin, in water, may be used as the binder. This binder is sprayed evenly over the entire cut mat by using a spray or the like so that the binder is allowed to adhere to the mat.

(3) Thereafter, in order to remove moisture contained in the binder liquid, the cut mat to which the binder has been allowed to adhere is dried. At this moment, as needed, the cut mat to which the binder has been allowed to adhere may be dried while compressed. As the drying condition, it is necessary to dry the binder for about 1 minute to about 30 minutes at about 95° C. to about 150° C., for example.

A mat with a longer full length and a mat with a shorter full length that form the holding sealing material of the present embodiment can be manufactured through the above-described processes. Here, the mat to be manufactured has a thickness of about 1.5 mm to about 15 mm.

(4) The two mats thus manufactured are laminated in the order of the mat with a shorter full length to the mat with a longer full length or vice versa. A typical exemplary lamination order upon laminating three or more mats is such a method that a mat with the longest full length is initially prepared, and then mats are sequentially laminated thereon so that the upper mat laminated on the lower mat has a shorter full length than that of the lower mat and the laminated upper mat having the shorter full length does not stick out of both ends of the lower mat having the longer full length.

(5) Next, there are prepared sewing threads having a diameter of about 0.1 mm to about 5 mm, having a color other than a transparent color and different from a color of the mat, and including cotton or polyester. Machine-sewing is conducted linearly in the following order: using the sewing threads, reverse stitching is carried out on the areas including a starting point of the laminated two mats and then carried out on the areas including an end point thereof so as to give a stitch length of about 1 mm to about 100 mm and form a fixed portion through the stitching. Here, the reverse stitching is performed by lock stitching. At this point, the mats are fixed to each other so that the fixed portion exists along the width direction substantially perpendicular to the longitudinal direction of the mat. When the shortest distance between a first end portion of the fixed portion and a first longer side face of the mat is defined as a first shortest distance and the shortest distance between a second end portion of the fixed portion and a second longer side face of the mat is defined as a second shortest distance, the fixed portion is formed so that a total of the first shortest distance and the second shortest distance is from about 0.5% to about 50% of a length of the mat in its width direction.

The holding sealing material of the present embodiment can be thus manufactured by mutually fixing the two mats.

Referring to the drawings, the following description will discuss a method for manufacturing an exhaust gas purifying apparatus.

FIG. 5 is a perspective view schematically illustrating the procedure of manufacturing an exhaust gas purifying apparatus of the present embodiment.

A holding sealing material 10, manufactured through the processes, is wound around the periphery of a substantially round pillar-shaped honeycomb filter 50 manufactured by a conventionally known method, with its projected portion 13*a* and recessed portion 13*b* of the mat 11 being fitted to each other. The winding process is further carried out so that the projected portion 23*a* and the recessed portion 23*b* of the mat 21 are fitted to each other.

Then, as illustrated in FIG. 5, the honeycomb filter 50 around which the holding sealing material 10 has been wound is press-fitted into a casing 60 with a substantially round pillar shape having a predetermined size, mainly made of metal and the like; thus, an exhaust gas purifying apparatus is manufactured.

Here, the internal diameter of the casing 60 is a little smaller than the diameter of the outermost diameter including the thickness of the holding sealing material 10 of the honeycomb filter 50 around which the holding sealing material 10 has been wound. Therefore, after the press fitting, the holding sealing material is compressed and tends to exert a predetermined repulsive force (that is, force for holding a honeycomb filter).

The following description will summarize the functions and effects of the holding sealing material and the exhaust gas purifying apparatus of the present embodiment.

(1) In the holding sealing material according to the present embodiment, since the two mats are fixed to each other by a fixed portion that exists along a width direction substantially perpendicular to the longitudinal direction of the mat, it may be easier to prevent displacement in the width direction of each of the mats.

In addition, since both end portions of the fixed portion are spaced apart from a first longer side face and a second longer side face of the mat, sewing thread are less likely to be frayed at both end portions of the fixed portion that has been formed by machine-sewing, even when these longer side faces are worn and/or stress is loaded in the vicinity of these longer side faces upon handling the holding sealing material. This may also make it easier to prevent the fixed portion from being damaged because of a frayed sewing thread, and to prevent displacement in the width direction of each of the mats.

As thus described, in the holding sealing material according to the present embodiment, since displacement in the width direction of the mats upon handling can be prevented, the handling property upon winding the holding sealing material around the exhaust gas treating body is favorable, more likely resulting in improvement in workability.

(2) Furthermore, since the first longer side face and the second longer side face of the mat are not machine-sewn, some of the inorganic fibers that form these longer side faces do not break, and the strength of the inorganic fibers is not lowered. Therefore, even when the holding sealing material according to the present embodiment is wound around the exhaust gas treating body and press-fitted into a casing, a crack does not occur around the first longer side face and the second longer side face, and it may be easier to prevent breakage of the holding sealing material.

In addition, since some of the inorganic fibers that form the first longer side face and the second longer side face do not break, these longer side faces also have the same resistance to wind erosion as other portions have. Therefore, it may be easier to prevent the wind erosion of the first longer side face and the second longer side face as the exhaust gases flow.

Accordingly, in the exhaust gas purifying apparatus using the holding sealing material according to the present embodiment, it may be easier to maintain high holding force of the exhaust gas treating body, and to prevent leakage of the exhaust gases.

(3) In the holding sealing material according to the present embodiment, since a total of the first shortest distance and the second shortest distance is from about 0.5% to about 50% of a length of the mat in its width direction and since the interval between the end portion of the fixed portion and the longer side face of the mat is sufficiently secured at both end portions of the fixed portion, it may be easier to suitably exert the above-described effects (1) and (2).

(4) In the holding sealing material according to the present embodiment, the fixed portion exists along a width direction substantially perpendicular to the longitudinal direction of the mat. Therefore, upon winding a holding sealing material, it may be easier to secure winding property of the holding sealing material by preventing the holding sealing material from being less likely to be wound by the tensile stress especially in the portion of the outer peripheral side. In addition, it may be easier to prevent a mat from being turned over from the first longer side face and the second side face of the mat, and consequently to suppress displacement of the mats more firmly.

(5) In the holding sealing material according to the present embodiment, since the mat has a thickness of about 1.5 mm to about 15 mm, it may be easier to maintain sufficient holding force and simultaneously prevent wrinkles in the portion of the inner peripheral side and the tensile stress in the portion of the outer peripheral side when the thickness of the mat is extremely increased.

(6) In the holding sealing material according to the present embodiment, needling treatment is carried out on the mat in the width direction substantially perpendicular to the longitudinal direction. Since the portion on which needling treatment is carried out is formed with a crease in its width direction of the mat, it is easier to wind the holding sealing material around the exhaust gas treating body.

(7) In the holding sealing material according to the present embodiment, since the fixed portion is formed by machine-sewing using a sewing thread, the fixed portion tends to be formed easily and the mats can be firmly fixed to each other.

(8) In the holding sealing material according to the present embodiment, since the machine-sewing is carried out by lock stitching, the stitches cannot be frayed easily even with some vibration upon handling, and the mats tend to be firmly fixed to each other.

(9) In the holding sealing material according to the present embodiment, since reverse stitching is carried out on at least one of a starting point and an end point of the machine-sewing, the stitches cannot be frayed easily, and the mats tend to be kept firmly fixed to each other for a long period of time.

(10) As in the holding sealing material according to the present embodiment, even when a stitch length of the machine-sewing is from about 1 mm to about 100 mm, it may be easier to suitably exert the effects of the present invention.

(11) In the holding sealing material according to the present embodiment, the sewing thread includes cotton or polyester. Therefore, after winding the holding sealing material around the exhaust gas treating body and assembling it to the exhaust gas purifying apparatus, the sewing thread is burned down with the hot exhaust gases that have been discharged by the first operation of the internal combustion engine. Here, if the fixed portion remains even after assembling it to the exhaust gas purifying apparatus, local stress may occur in the portion, and the holding sealing material may be damaged. When the sewing thread is burned down, there is no possibility of the damage, with the result that it may be easier to exert the function of the holding sealing material in a stable manner for a long period of time.

(12) In the holding sealing material according to the present embodiment, since the sewing thread has a diameter of about 0.1 mm to about 5 mm, the sewing thread is less likely to be cut, and it may be easier to form the fixed portion while minimizing the damage to the inorganic fibers that form the vicinity of the stitches upon sewing.

(13) In the holding sealing material according to the present embodiment, the sewing thread has a color other than a transparent color and different from a color of the mat. Therefore, the work efficiency tends to be improved by raising the visibility for checking whether the fixed portion has been formed.

(14) In the method for manufacturing a holding sealing material according to the present embodiment, it may be easier to suitably manufacture the holding sealing material according to the present embodiment by exerting the above-described effects of (1) to (13).

The following description will discuss Examples that specifically disclose the first embodiment of the present invention. Here, the present invention is not intended to be limited only by these Examples.

EXAMPLE 1

A base mat having a compounding ratio of $Al_2O_3$:$SiO_2$=72:28 was prepared as a base mat made of alumina fibers having an alumina-silica composition. The needle treating mat was manufactured by carrying out needling treatment on this base mat.

Next, the needle treating mat was cut into a predetermined size. The binder liquid was sprayed evenly over the cut mat by using a spray so as to give 3.0% by weight of the binder with respect to the amount of alumina fibers of the obtained cut mat, so that the binder was allowed to adhere to the mat.

As the binder liquid, the binder obtained by preparing an acrylic-based resin emulsion was used by sufficiently dispersing an acrylic-based resin in water.

Then, by drying the cut mat to which the binder was allowed to adhere for 5 minutes at 140° C., there was manufactured a mat having a full length of 1054 mm×a width of 295 mm×a thickness of 6.5 mm in a plan view, a bulk density of 0.15 g/cm$^3$, and a weight per square meter of 1160 g/m$^2$.

A mat 21 located outside the mat 11 was further manufactured by following the same procedure, except that the full length was set to 1100 mm.

The two mats thus manufactured were sequentially laminated in such a position that the laminated upper mat having a shorter full length does not stick out of both ends of the lower mat having a longer full length.

Subsequently, a red sewing thread having a diameter of 1 mm and including cotton was prepared.

Machine-sewing was conducted linearly in the following order: using the sewing threads, reverse stitching is carried out on the areas including a starting point of the laminated two mats and then carried out on the areas including an end point thereof so as to give a stitch length of 10 mm and form a fixed portion through the stitching. Here, the reverse stitching was performed by lock stitching. At this point, the mats were stitched so that the fixed portion existed along the width direction perpendicular to the longitudinal direction of the mats. In addition, the length of reverse stitching was 3 mm from the starting point and the end point. Furthermore, the fixed portion was formed in such a manner that both end portions of the fixed portion were spaced apart from the first longer side face and the second longer side face of the mat so that the shortest distance between the end portion of the fixed portion and the longer side face of the mat was set to 10 mm at both end portions, that is, the total of the first shortest distance and the second shortest was set to 22% of the length of the width direction of the mat (both the first shortest distance and the second shortest distance were 11% of the length of the width direction of the mat).

Thus, the two mats were fixed to each other to manufacture a holding sealing material of Example 1.

EXAMPLES 2, 3, AND 4

A holding sealing material was manufactured by following the same procedure as in Example 1, except that the total of the first shortest distance and the second shortest distance was set to 0.5% (a percentage of the first shortest distance or the second shortest distance to the length of the width direction of the mat: 0.25%), 2% (ditto: 1%), and 40% (ditto: 20%) in Examples 2, 3, and 4, respectively.

In the holding sealing materials of Examples 1 to 4, since the first longer side face and the second longer side face were not machine-sewn, and since some of the inorganic fibers that form the longer side face do not break, it may be considered easier to maintain high holding force of the exhaust gas treating body in the exhaust gas purifying apparatus using the holding sealing material according to Examples 1 to 4. Moreover, it may be easier to prevent leakage of the exhaust gases.

COMPARATIVE EXAMPLE 1

A holding sealing material was manufactured by following the same procedure as in Example 1, except that the fixed portion was provided over the entire width direction of each of the mats by forming the fixed portion by stitching each of the mats for both end portions of the fixed portion to reach the longer side faces.

In the holding sealing material according to Comparative Example 1, since the entire width direction of the mats including the first longer side face and the second longer side face were machine-sewn in order to form a fixed portion, some of the inorganic fibers that form the longer side face presumably break, likely leading to low strength of the longer side face. For this reason, in the case where the holding sealing material of this kind is wound around the exhaust gas treating body and press-fitted into a casing, it is supposed that a crack occurs around the longer side face and the holding sealing material breaks. Moreover, even if a crack does not occur on the mat, since some of the inorganic fibers that form the longer side face break and resistance to wind erosion of the longer side face is lowered, the longer side face is presumably wind-eroded with the flow of exhaust gases.

Therefore, in the exhaust gas purifying apparatus using the holding sealing material according to Comparative Example 1, conceivably, the holding force of the exhaust gas treating body decreases as a result of breakage of the holding sealing material and wind erosion, the exhaust gas treating body comes off, and the exhaust gases leak between the exhaust gas treating body and the casing.

The characteristics of the holding sealing materials manufactured in Examples 1 to 4 and Comparative Example 1 were evaluated by performing an unstitching test. Here, the evaluations were made by manufacturing samples in which fixed portions corresponding to the holding sealing materials manufactured in Examples 1 to 4 and Comparative Example 1.

This will be described in the following with reference to the drawings.

Figure 6A:
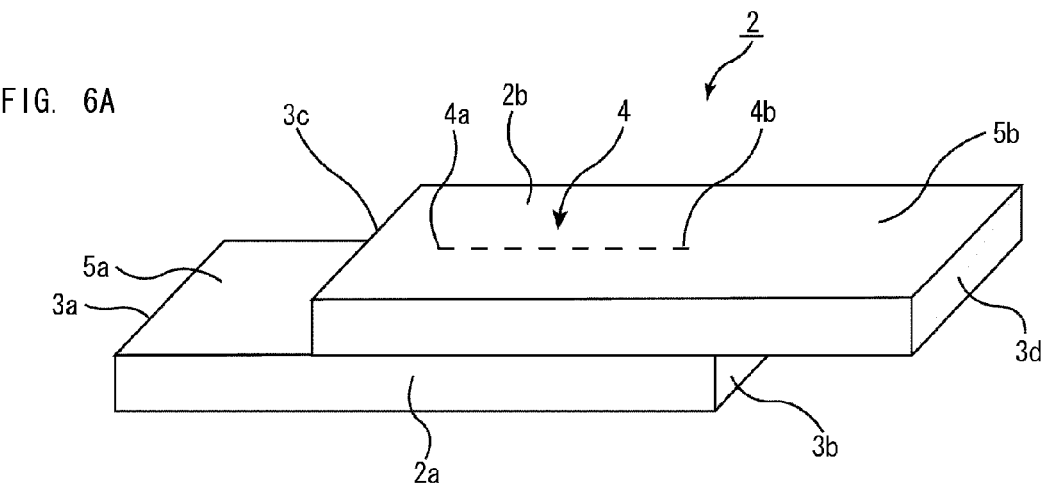
FIG. 6A is a perspective view schematically illustrating a sample for an unstitching test.
Figure 6B:
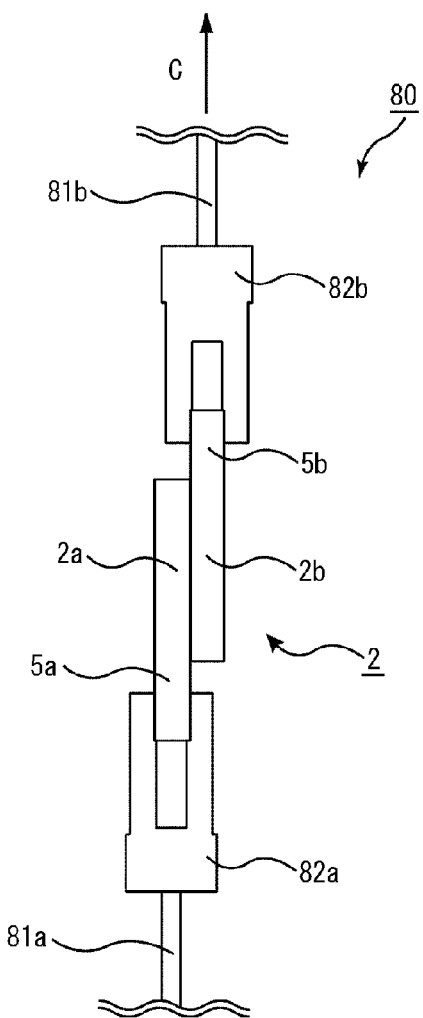
FIG. 6B is an explanatory view of an unstitching test device.

FIG. 6A is a perspective view schematically illustrating a sample for the unstitching test, and FIG. 6B is an explanatory view of an unstitching test device.

(Sample Manufacture)

First, as illustrated in FIG. 6A, the mat 11 manufactured in Example 1 was cut into mat pieces 2a and 2b each having a width of 10 mm×a length of 60 mm.

Next, the two mat pieces 2a and 2b were laminated on each other in such a manner that the distance between the end face 3a (3b) of one mat piece 2a and the end face 3c (3d) of the other mat piece 2b was set to 20 mm (the length of the portion on which the mat pieces 2a and 2b were laminated was et to 40 mm).

Subsequently, the fixed portion 4 was formed by linearly machine-sewing (lock stitching) each of the mat pieces 2a and 2b along the length direction. At this moment, machine-sewing was carried out to obtain a sample 2 so that the percentage of the shortest distance between the end face 3b (3c) of the mat piece 2a (2b) and the end portion 4b (4a) of the fixed portion 4 to the length of the portion on which the mat pieces 2a and 2b were laminated was set to a predetermined value. Here, samples equivalent to Examples 1 to 4 and Comparative Example 1 were manufactured as Test Examples 1 to 5.

Specifically, as Test Examples 1 to 5, the total of the shortest distances of the end face 3b (3c) of the mat piece 2a (2b) and the end portion 4b (4a) of the fixed portion 4 was set to 22%, 0.5%, 2%, 40%, and 0%, respectively, of the length of the portion on which the mat pieces 2a and 2b are laminated.

Here, in Test Examples 1 to 4, samples were manufactured so that the shortest distance between the end portion of the fixed portion and the end face of the mat piece was the same length at both end portions.

In addition, the portions on which the mat pieces 2a and 2b are not laminated on each other, out of the mat pieces 2a and 2b, are holding portions 5a and 5b.

(Unstitching Test)

The unstitching test will be described.

As an unstitching test equipment 80 illustrated in FIG. 6B, an Instron universal material tester (5567, manufactured by Instron Corp.) was used, and this equipment includes a lower chuck 81a fixed to a tester main body which is not illustrated, and an upper chuck 81b that is allowed to move in a vertical direction. The lower chuck 81a and the upper chuck 81b respectively have holding portions 82a and 82b used for grabbing holding portions 5a and 5b of the sample 2.

A test method using this unstitching test equipment 80 is as follows.

With respect to the holding portions 5a and 5b of the sample 2 manufactured through the above-mentioned processes, one holding portion 5a was grabbed by the holding portion 82a of the lower chuck 81a and the other holding portion 5b was grabbed by the holding portion 82b of the upper chuck 81b.

In this state, the upper chuck 81b was moved above the vertical direction (direction indicated by an arrow C in FIG. 6B), and a load was applied to the sample 2. This operation was continued until the fixed portion 4 of the sample 2 was damaged and the sewing thread was frayed to cause the mat pieces 2a and 2b to be peeled or the mat pieces 2a and 2b to break.

Table 1 shows the results.

TABLE 1

| | Shortest distance (Note 1) (%) | | | Unstitching test (frayed sewing thread) | |
|---|---|---|---|---|---|
| | One end portion | The other end portion | Total | One end portion | The other end portion |
| Test Example 1 | 11 | 11 | 22 | Absent | |
| Test Example 2 | 0.25 | 0.25 | 0.5 | Absent | |
| Test Example 3 | 1 | 1 | 2 | Absent | |
| Test Example 4 | 20 | 20 | 40 | Absent | |
| Test Example 5 | — (Note 2) | | 0 | Present | |

Note 1:
The shortest distance refers to the shortest interval among the intervals between the end portion of the fixed portion and the longer side face of the mat, and the numerical values show the percentage of the shortest distance to the length of the portion on which mat pieces were laminated.
Note 2:
A fixed portion was formed by stitching each of the mats for both end portions of the fixed portion to reach end faces of the mat pieces.

In Test Examples 1 to 4, as shown in Table 1, although a load was applied until the mat pieces broke, the fixed portion of the samples did not break, a sewing thread was not frayed at both ends of the fixed portion.

For this reason, in the holding sealing materials of Examples 1 to 4 equivalent to Test Examples 1 to 4, when the fixed portion exists along the width direction, it may be probably easier to prevent displacement in the width direction of each of the mats.

Thus, in the holding sealing materials in Examples 1 to 4, upon handling the holding sealing material such as winding the holding sealing material around an exhaust gas treating body or transporting it, sewing threads are less likely to be frayed at both end portions of the fixed portion even by wearing the longer side face and loading stress in the vicinity of the longer side face. For this reason, the handling property upon winding the holding sealing material around the exhaust gas treating body is favorable, more likely resulting in improvement in workability.

On the other hand, in Test Example 5, before the mat pieces broke, a sewing thread was frayed around both end portions of the fixed portion to damage the fixed portion.

For this reason, in the holding sealing material of Comparative Example 1 equivalent to Test Example 5, even when the fixed portion exists along the width direction, it is presumably impossible to prevent displacement in the width direction of each of the mats.

(Other Embodiments)

The fixed portion in the holding sealing material according to the embodiments of the present invention may be formed by the above-mentioned machine-sewing, or may be formed by well-known methods in the technical field, such as needling and fixing methods using an adhesive, a staple, a pin, a tape, and the like.

Here, upon using an adhesive, for example, a mark may be put (by standing a stick in parallel with a lamination direction at the position corresponding to the fixed portion on the side face of the mat, and the like, for example) so as to correspond to the position of the fixed portion, and then the two mats, the upper and lower mats, may be sequentially fixed with an adhesive along the mark.

In the holding sealing material according to the embodiments of the present invention, it is necessary for the fixed portion to extend along the width direction substantially perpendicular to the longitudinal direction of the mat, and specifically, the shape may be linear as described above or may have at least one of a folding point and an inflection point.

Examples of the shape having at least one of the folding point and the inflection point include a circular shape, a shape of a wavy line, a zigzag shape, a C shape, a V shape, a U shape, a W shape, an L shape, an X shape, an S shape, a rectangular shape, an elliptical shape, and the like.

In order to form the fixed portion having such a shape by machine-sewing, it is necessary to perform the machine-sewing so as to give any one of the above-mentioned shapes. It is also needed to perform the machine-sewing employing the function of forming a stitch of the above-mentioned shape when the sewing machine is equipped with the function.

It is acceptable to apply an adhesive to the mats having one of the above-mentioned shapes and adhere the mats, upon forming a fixed portion with an adhesive.

In the case where machine-sewing is used as a method for fixing each of the mats in the holding sealing material according to the embodiments of the present invention, examples of the material of the sewing thread include, in addition to the above-mentioned cotton and polyester: cellulosic fibers such as rayon, cuprammonium rayon, and acetate; synthetic fibers such as nylon, tetron, acryl, vinylon, operon, polyethylene, Teflon (registered trademark), vinyl chloride, and vinylidene chloride; natural fibers such as silk; and the like.

Upon performing machine-sewing in the holding sealing material according to the embodiments of the present invention, a method for twisting a sewing thread is not particularly limited, and a first twist may be performed in the first yarn stage, or a second twist may be performed after yarn doubling. Also, a Z twist (left-handed twist) or an S twist (right-handed twist) may be used; and in order to prevent a twist back by rotation of a shuttle of the sewing machine, it is desirable to use a Z twist as a second twist.

In the holding sealing material according to the embodiments of the present invention, when machine-sewing is used as a method for fixing each of the mat materials, the stitching method is not limited to the above-mentioned lock stitching, and examples thereof include basting and the like.

Lock stitching is more preferable among these because it is possible to fix each of the mat materials more firmly.

In the holding sealing material according to the embodiments of the present invention, the number of the mats to be laminated is not limited to two as thus described, and may increase or decrease depending on its holding force and heat insulating property which are required for the holding sealing material.

The relative position of the mats to be laminated may be such that: as thus described, the upper mat to be laminated having the shorter full length may not stick out of both ends of the lower mat having the longer full length; or the upper mat may stick out of either one of the ends of the lower mat having the longer full length because of mutual displacement in the longitudinal direction.

The shapes of a recessed portion and a projected portion that are formed on a shorter side face of the holding sealing material according to the embodiments of the present invention is not particularly limited as long as the shapes enable the recessed portion to be fitted to the projected portion. In the case where one set of a recessed portion and a projected portion is formed, desirably, the projected portion that projects over a size from about 10 mm in width×about 10 mm in length to about 300 mm in width×about 100 mm in length is formed on one portion of a shorter side face on one side, and the recessed portion that is fitted to the projected portion is formed on one portion of a shorter side face on the other side. In the case where an exhaust gas purifying apparatus is manufactured using the holding sealing material having such shapes of the recessed portion and the projected portion, an exhaust gas treating body tends to be surely held by the holding sealing material, leading to excellent handleability.

In addition, a plurality of the recessed portions and projected portions that are fitted to each other may be formed in the shorter side face of the holding sealing material, or recessed portions and projected portions may not be formed therein.

In the holding sealing material according to the embodiments of the present invention, the average fiber length of inorganic fibers is desirably from about 30 µm to about 120 mm, and more desirably from about 50 µm to about 100 mm.

In the holding sealing material according to the embodiments of the present invention, the average fiber diameter of inorganic fibers is desirably from about 2 µm to about 12 µm, and more desirably from about 3 µm to about 10 µm.

The amount of binder contained in the holding sealing material according to the embodiments of the present invention is desirably from about 0.2% by weight to about 20% by weight, more desirably from about 0.5% by weight to about 15% by weight, and most desirably from about 1% by weight to about 12% by weight. In a case where the amount of the binder is about 0.2% by weight or more, since the bulk density of the holding sealing material tends not to be low, the press-injecting property of the holding sealing material into the casing tends not to be lowered. Moreover, the inorganic fibers tend to be sufficiently bonded to one another, with the result that the inorganic fibers tend not to be scattered. In contrast, in a case where the amount of the binder of 20% by weight or less, since, upon use of an exhaust gas purifying apparatus, the amount of organic components in exhaust gases to be discharged tends not to increase, a higher load is less likely to be applied to the environment.

Although not particularly limited, the weight per square meter of the holding sealing according to the embodiments of the present invention is desirably from about 200 g/m$^2$ to about 2000 g/m$^2$, and more desirably from 300 g/m$^2$ to about 1900 g/m$^2$.

Although not particularly limited, the bulk density thereof is desirably from about 0.10 g/cm$^3$ to about 0.30 g/cm$^3$.

The binder used for manufacturing the holding sealing material according to the embodiments of the present invention is not limited to the acrylic-based resin, and examples thereof include: rubbers such as acrylic rubber; water-soluble organic polymers such as carboxymethyl cellulose or polyvinyl alcohol; thermoplastic resins such as styrene resin; thermosetting resins such as epoxy resin; and the like. Particularly preferred among these are acrylic rubber, acrylonitrile-butadiene rubber, and styrene-butadiene rubber.

The binder liquid used for manufacturing a holding sealing material according to the embodiments of the present invention may include a plurality of kinds of the above-mentioned organic binders.

Examples of the binder liquid include: an emulsion obtained by dispersing the above-mentioned binder in water; a solution in which the above-mentioned binder is dissolved in water or an organic solvent; and the like.

The binder liquid may further include an inorganic binder. Examples of the inorganic binder include alumina sol, silica sol, and the like.

The thickness of each of the mats of the holding sealing material according to the embodiments of the present invention may be substantially the same as or different from each other. The thickness can be changed in consideration of flexibility, holding force, and the like which are required of the holding sealing material.

Although not particularly limited as long as it is a heat-resistant metal, examples of the material for the casing forming one component of the exhaust gas purifying apparatus according to the embodiments of the present invention include metals, such as stainless steel, aluminum and iron.

In a case where an exhaust gas purifying apparatus is manufactured by using a round pillar-shaped casing in the method for manufacturing an exhaust gas purifying apparatus according to the embodiments of the present invention, what is called a sizing system may be used to manufacture the exhaust gas purifying apparatus. In the exhaust gas purifying apparatus, after an exhaust gas treating body, with a holding sealing material being wound around, has been inserted into a casing having an inner diameter larger than the total combined length of the diameter of the end face of the exhaust gas treating body and the thickness of the holding sealing material that has been wound around the exhaust gas treating body, the casing is compressed from the peripheral side by a pressing machine or the like.

The exhaust gas treating body forming one component of the exhaust gas purifying apparatus according to the embodiments of the present invention may be prepared as an integral exhaust gas treating body configured by one sintered body including cordierite and the like as a whole, illustrated in FIG. 4A, or may be prepared as an aggregated exhaust gas treating body obtained by using adhesive layers and combining a plurality of honeycomb fired bodies including silicon carbide and the like, each having a structure in which a large number of cells are longitudinally disposed in parallel with one another, with a cell wall being interposed therebetween.

Catalyst may be supported on the exhaust gas treating body forming one component of the exhaust gas purifying apparatus according to the embodiments of the present invention. Examples of the catalyst include: noble metals such as platinum, palladium, and rhodium; alkali metals such as potassium and sodium; alkali earth metals such as barium; metal oxides; and the like. These catalysts can be used alone or in combination of two or more.

In addition, the oxide catalyst is not particularly limited as long as it can lower the burning temperature of PM, and examples thereof include $CeO_2$, $ZrO_2$, $FeO_2$, $Fe_2O_3$, $CuO$, $CuO_2$, $Mn_2O_3$, $MnO$, complex oxides indicated by a composition formula $A_nB_{1-n}CO_3$ (in the formula, A is La, Nd, Sm, Eu, Gd or Y; B is an alkali metal or alkali-earth metal; C is Mn, Co, Fe or Ni; and $0 \leq n \leq 1$), and the like.

Each of these catalysts may be used alone, or two or more kinds of these may be used in combination; however, the catalyst desirably contains at least $CeO_2$.

By supporting a metal oxide of this kind, the burning temperature of PM tends to be lowered.

Examples of the method for applying catalyst to the exhaust gas treating body include: a method in which the exhaust gas treating body is impregnated with a solution containing catalyst and then heated; a method for forming a catalyst supporting layer consisting of an alumina film and applying catalyst to the alumina film; and the like.

Examples of the method for forming the alumina film include: a method in which the exhaust gas treating body is impregnated with a solution of a metal compound containing aluminum such as $Al(NO_3)_3$ and then heated; a method in which the gas treating body is impregnated with a solution containing alumina powder and then heated; and the like.

Examples of the method for applying catalyst to the alumina film include: a method in which the exhaust gas treating body is impregnated with a solution containing a noble metal, an alkaline metal, an alkaline earth metal, and a metal oxide, and the like, and then heated; and the like.

Obviously, numerous modifications and variations of the present invention are possible in light of the above teachings.

It is therefore to be understood that within the scope of the appended claims, the invention may be practiced otherwise than as specifically described herein.

What is claimed as new and desired to be secured by Letters Patent of the United States is:

1. A holding sealing material comprising:
    a plurality of mats having a longitudinal direction and first and second longer side faces along the longitudinal direction and comprising a lower mat and an upper mat laminated on the lower mat, each of said plurality of mats comprising inorganic fibers and having a substantially rectangular shape;
    a length of the lower mat in the longitudinal direction being longer than a length of the upper mat in the longitudinal direction;
    each of said plurality of mats being connected to each other at a fixed portion which extends substantially along a width direction perpendicular to the longitudinal direction of said plurality of mats;
    the fixed portion having a first end portion and a second end portion in the width direction, the first end portion being on a side of the first longer side face, the second end portion being on a side of the second longer side face, the first end portion and the second end portion being spaced apart from the first longer side face and the second longer side face, respectively;
    wherein at least one of a first shortest distance and a second shortest distance is longer than a stitch length;
    wherein the first shortest distance is a shortest distance between the first end portion of said fixed portion and the first longer side face of said plurality of mats, and the second shortest distance is a shortest distance between the second end portion of said fixed portion and the second longer side face of said plurality of mats;
    wherein said fixed portion is formed by machine-sewing using a sewing thread; and
    wherein reverse stitches are provided on at least one of a starting point and an end point of the machine-sewing.

2. The holding sealing material according to claim 1, wherein a sum of a first shortest distance and a second shortest distance is from about 0.5% to about 50% of a width of said plurality of mats in the width direction.

3. The holding sealing material according to claim 2, wherein the sum of the first shortest distance and the second shortest distance is about 2% to about 50% of the width of said plurality of mats in the width direction.

4. The holding sealing material according to claim 2, wherein the sum of the first shortest distance and the second shortest distance is about 22% to about 50% of the width of said plurality of mats in the width direction.

5. The holding sealing material according to claim 1, wherein said fixed portion has at least one of a folding point and an inflection point.

6. The holding sealing material according to claim 1, wherein each of said plurality of mats has a thickness of about 1.5 mm to about 15 mm.

7. The holding sealing material according to claim 1, wherein each of said plurality of mats has substantially same thickness.

8. The holding sealing material according to claim 1, wherein needling treatment is carried out on said plurality of mats in the width direction perpendicular to the longitudinal direction.

9. The holding sealing material according to claim 1, wherein the machine-sewing is carried out by lock stitching.

10. The holding sealing material according to claim 1, wherein the stitch length of the machine-sewing is from about 1 mm to about 100 mm.

11. The holding sealing material according to claim 1, wherein the sewing thread comprises at least one of cotton and polyester.

12. The holding sealing material according to claim 1, wherein the sewing thread has a diameter of about 0.1 mm to about 5 mm.

13. The holding sealing material according to claim 1, wherein the sewing thread has a color other than a transparent color and different from a color of each of said plurality of mats.

14. The holding sealing material according to claim 1, wherein a first twist is performed in a first yarn stage in the sewing thread.

15. The holding sealing material according to claim 14, wherein a second twist is performed in the sewing thread after yarn doubling.

16. The holding sealing material according to claim 15, wherein said second twist comprises a Z twist.

17. The holding sealing material according to claim 1, wherein the upper mat has first and second longitudinal ends in the longitudinal direction, the lower mat has third and fourth longitudinal ends in the longitudinal direction, and the first and second longitudinal ends of the upper mat are positioned between the third and fourth longitudinal ends of the lower mat.

18. The holding sealing material according to claim 1, wherein the upper mat has first and second longitudinal ends in the longitudinal direction, the lower mat has third and fourth longitudinal ends in the longitudinal direction, and either one of the first and second longitudinal ends of the upper mat projects from either one of the third and fourth longitudinal ends of the lower mat.

19. The holding sealing material according to claim 1, wherein both of the first shortest distance and the second shortest distance are longer than the stitch length.

20. The holding sealing material according to claim 1, wherein reverse stitches are provided on both of the starting point and the end point of the machine-sewing.

21. An exhaust gas purifying apparatus comprising:
    an exhaust gas treating body comprising:
        cell walls longitudinally extending to define cells;
        a casing which accommodates said exhaust gas treating body; and
        a holding sealing material provided between said exhaust gas treating body and said casing to hold said exhaust gas treating body, said holding sealing material comprising:
            a plurality of mats having a longitudinal direction and first and second longer side faces along the longitudinal direction and comprising a lower mat and an upper mat laminated on the lower mat, each of said plurality of mats comprising inorganic fibers and having a substantially rectangular shape;
            a length of the lower mat in the longitudinal direction being longer than a length of the upper mat in the longitudinal direction;
            each of said plurality of mats being connected to each other at a fixed portion which extends substantially along a width direction perpendicular to the longitudinal direction of said plurality of mats; and
            the fixed portion having a first end portion and a second end portion in the width direction, the first end portion being on a side of the first longer side face, the second end portion being on a side of the second longer side face, the first end portion and the second end portion being spaced apart from the first longer side face and the second longer side face, respectively;

wherein at least one of a first shortest distance and a second shortest distance is longer than a stitch length;

wherein the first shortest distance is a shortest distance between the first end portion of said fixed portion and the first longer side face of said plurality of mats, and the second shortest distance is a shortest distance between the second end portion of said fixed portion and the second longer side face of said plurality of mats;

wherein said fixed portion is formed by machine-sewing using a sewing thread; and wherein reverse stitches are provided on at least one of a starting point and an end point of the machine-sewing.

22. The exhaust gas purifying apparatus holding sealing material according to claim 21, wherein a sum of a first shortest distance and a second shortest distance is from about 0.5% to about 50% of a width of said plurality of mats in the width direction.

23. The exhaust gas purifying apparatus holding sealing material according to claim 22, wherein the sum of the first shortest distance and the second shortest distance is about 2% to about 50% of the width of said plurality of mats in the width direction.

24. The exhaust gas purifying apparatus holding sealing material according to claim 22, wherein the sum of the first shortest distance and the second shortest distance is about 22% to about 50% of the width of said plurality of mats in the width direction.

25. The exhaust gas purifying apparatus holding sealing material according to claim 21, wherein said fixed portion has at least one of a folding point and an inflection point.

26. The exhaust gas purifying apparatus holding sealing material according to claim 21, wherein each of said plurality of mats has a thickness of about 1.5 mm to about 15 mm.

27. The exhaust gas purifying apparatus holding sealing material according to claim 21, wherein each of said plurality of mats has substantially same thickness.

28. The exhaust gas purifying apparatus holding sealing material according to claim 21, wherein needling treatment is carried out on said plurality of mats in the width direction perpendicular to the longitudinal direction.

29. The exhaust gas purifying apparatus holding sealing material according to claim 21, wherein the machine-sewing is carried out by lock stitching.

30. The exhaust gas purifying apparatus holding sealing material according to claim 21, wherein the stitch length of the machine-sewing is from about 1 mm to about 100 mm.

31. The exhaust gas purifying apparatus holding sealing material according to claim 21, wherein the sewing thread comprises at least one of cotton and polyester.

32. The exhaust gas purifying apparatus holding sealing material according to claim 21, wherein the sewing thread has a diameter of about 0.1 mm to about 5 mm.

33. The exhaust gas purifying apparatus holding sealing material according to claim 21, wherein the sewing thread has a color other than a transparent color and different from a color of each of said plurality of mats.

34. The exhaust gas purifying apparatus holding sealing material according to claim 21, wherein a first twist is performed in a first yarn stage in the sewing thread.

35. The exhaust gas purifying apparatus holding sealing material according to claim 34, wherein a second twist is performed in the sewing thread after yarn doubling.

36. The exhaust gas purifying apparatus holding sealing material according to claim 35, wherein said second twist comprises a Z twist.

37. The exhaust gas purifying apparatus holding sealing material according to claim 21, wherein the upper mat has first and second longitudinal ends in the longitudinal direction, the lower mat has third and fourth longitudinal ends in the longitudinal direction, and the first and second longitudinal ends of the upper mat are positioned between the third and fourth longitudinal ends of the lower mat.

38. The exhaust gas purifying apparatus holding sealing material according to claim 21, wherein the upper mat has first and second longitudinal ends in the longitudinal direction, the lower mat has third and fourth longitudinal ends in the longitudinal direction, and either one of the first and second longitudinal ends of the upper mat projects from either one of the third and fourth longitudinal ends of the lower mat.

39. The exhaust gas purifying apparatus according to claim 21, wherein both of the first shortest distance and the second shortest distance are longer than the stitch length.

40. The exhaust gas purifying apparatus according to claim 21, wherein reverse stitches are provided on both of the starting point and the end point of the machine-sewing.

41. An exhaust gas purifying apparatus comprising:
an exhaust gas treating body comprising:
cell walls longitudinally extending to define cells;
a casing which accommodates said exhaust gas treating body; and
a holding sealing material provided between said exhaust gas treating body and said casing to hold said exhaust gas treating body, said holding sealing material being manufactured using a method comprising:
laminating a plurality of mats having a longitudinal direction and first and second longer side faces along the longitudinal direction and comprising a lower mat and an upper mat to be laminated on the lower mat, each of the plurality of mats comprising inorganic fibers and having a substantially rectangular shape, a length of the lower mat in the longitudinal direction being longer than a length of the upper mat in the longitudinal direction; and
connecting each of the plurality of mats to each other at a fixed portion which extends substantially along a width direction perpendicular to the longitudinal direction of said plurality of mats, the fixed portion having a first end portion and a second end portion in the width direction, the first end portion being on a side of the first longer side face, the second end portion being on a side of the second longer side face, the first end portion and the second end portion being spaced apart from the first longer side face and the second longer side face, respectively;

wherein at least one of a first shortest distance and a second shortest distance is longer than a stitch length;

wherein the first shortest distance is a shortest distance between the first end portion of said fixed portion and the first longer side face of said plurality of mats, and the second shortest distance is a shortest distance between the second end portion of said fixed portion and the second longer side face of said plurality of mats;

wherein said fixed portion is formed by machine-sewing using a sewing thread; and wherein reverse stitches are provided on at least one of a starting point and an end point of the machine-sewing.

42. The exhaust gas purifying apparatus according to claim 41,
wherein a sum of a first shortest distance and a second shortest distance is from about 0.5% to about 50% of a width of said plurality of mats in the width direction.

43. The exhaust gas purifying apparatus according to claim 42,
wherein the sum of the first shortest distance and the second shortest distance is about 2% to about 50% of the width of said plurality of mats in the width direction.

44. The exhaust gas purifying apparatus according to claim 42,
wherein the sum of the first shortest distance and the second shortest distance is about 22% to about 50% of the width of said plurality of mats in the width direction.

45. The exhaust gas purifying apparatus according to claim 41, wherein both of the first shortest distance and the second shortest distance are longer than the stitch length.

46. The exhaust gas purifying apparatus according to claim 41, wherein reverse stitches are provided on both of the starting point and the end point of the machine-sewing.

* * * * *